UNITED STATES PATENT OFFICE.

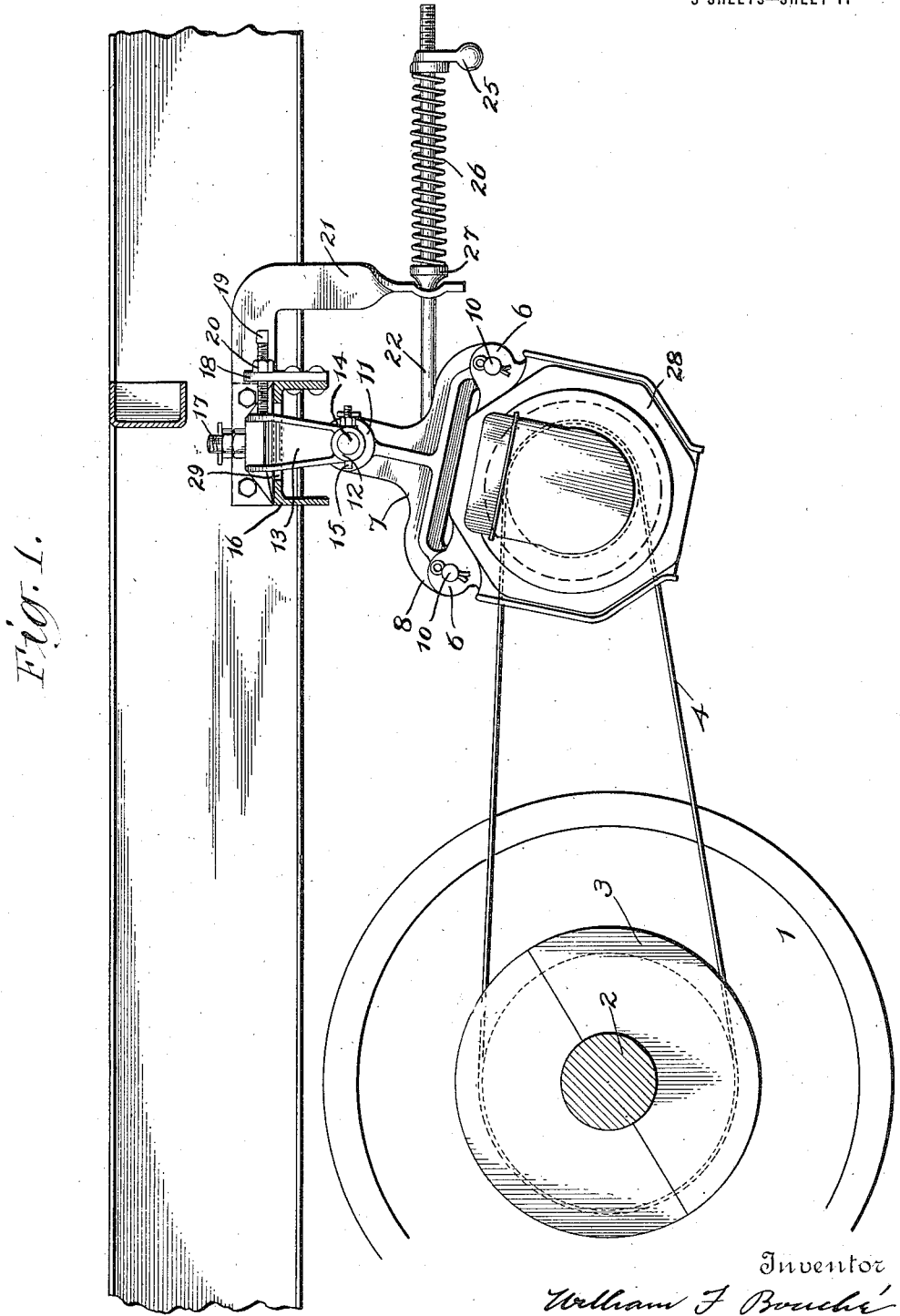

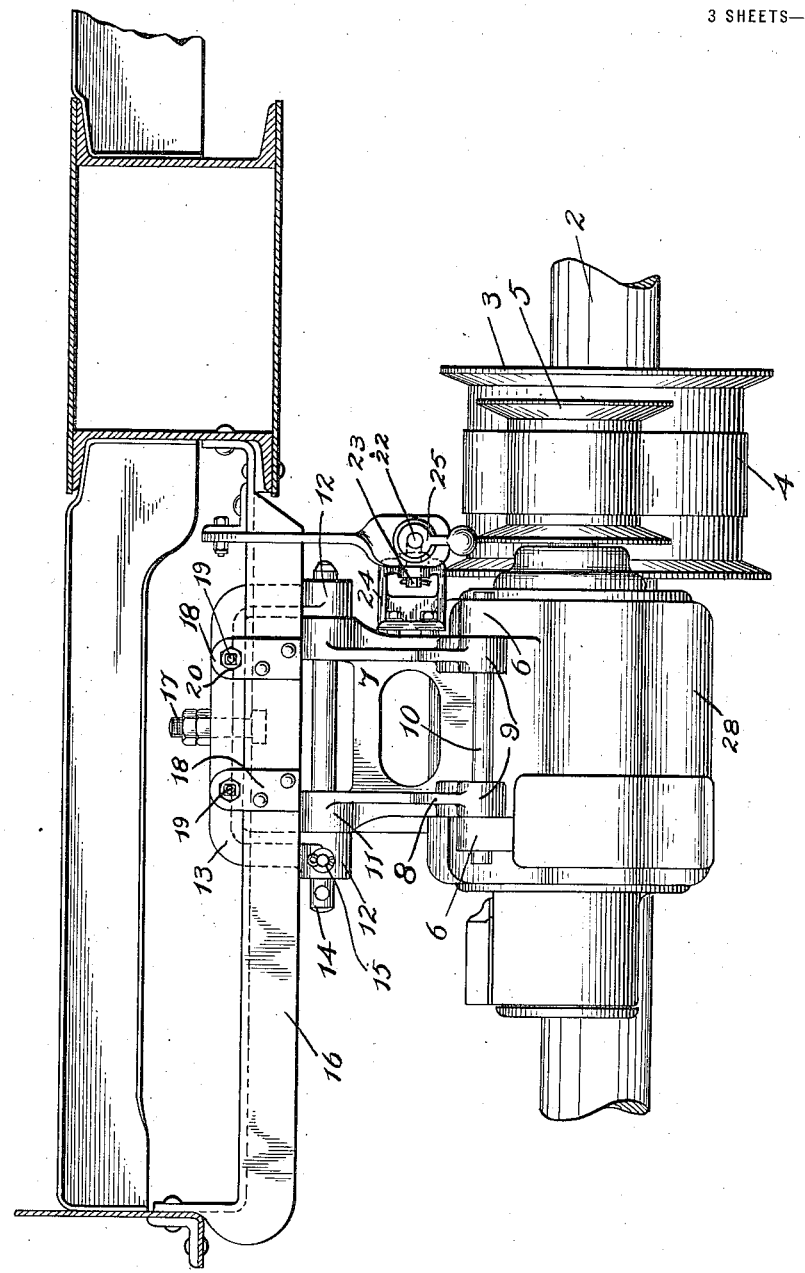

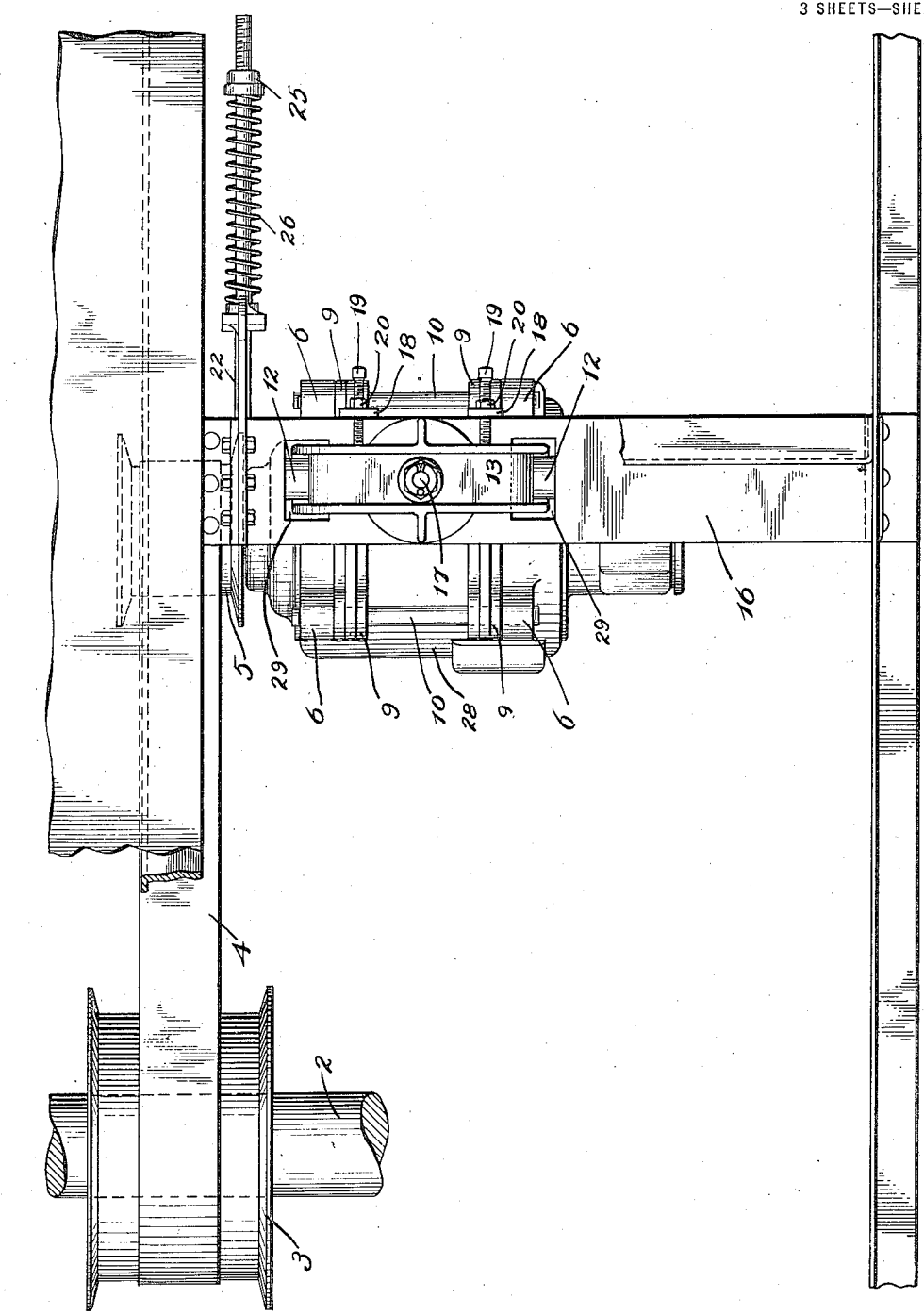

WILLIAM F. BOUCHÉ, OF BUFFALO, NEW YORK, ASSIGNOR TO GOULD COUPLER COMPANY, A CORPORATION OF NEW YORK.

DYNAMO-MOUNTING.

1,324,029. Specification of Letters Patent. Patented Dec. 9, 1919.

Application filed September 21, 1916, Serial No. 121,499. Renewed May 8, 1919. Serial No. 295,702.

*To all whom it may concern:*

Be it known that I, WILLIAM F. BOUCHÉ, a citizen of the United States, residing at Buffalo, county of Erie, State of New York, have invented certain new and useful Improvements in Dynamo-Mountings, of which the following is a description.

My invention pertains to that class of means or mechanism used to mount a dynamo upon a structure and hold the dynamo in proper operative relation to a driving member, the position of which with relation to the said structure is considerably altered during the operation of the dynamo. As my improved mounting is particularly applicable to a generator suspended from the body of a car and driven by a belt, or similar means, passing over a pulley or other driving means upon the car axle, it will be described with reference to such application.

In the drawing, Figure 1 is an end elevation and partial section of my improved mounting as used to suspend a generator from the underframing of a modern steel railway car.

Fig. 2 is a side elevation of my mounting and a generator applied as in Fig. 1.

Fig. 3 is a top plan of my mounting and a generator applied as shown in Figs. 1 and 2.

In the drawing, 1 represents an ordinary car wheel provided with the axle 2, upon which is mounted a suitable flanged driving pulley as indicated at 3, and adapted to engage a belt or other suitable driving device 4 which engages the dynamo driving pulley indicated at 5, carried by the shaft of the dynamo 28 which is preferably provided with four lugs or bosses 6 by means of which the dynamo may be attached to any suitable type of mounting or carrying means.

My invention comprehends a spider or framework 7, provided with arms 8, the extremities of which are provided with hubs 9, fitting closely between the bosses 6 and perforated to receive pins 10 which firmly attach the dynamo to the spider. The pins 10 are held in place by means of any suitable type of cotter pin or other desired means. The spider 7 is provided with suspending bosses 11 which fit closely between the bosses 12, forming the extremities of a yoke or clevis 13. A pin 14 passes through suitable openings in the bosses 12 and 11 so as to rotatably connect the clevis and the spider 7. The pin 14 is preferably held in place as by a pin 15, passing through one of the bosses 12 and the pin 14 and preventing rotation of the pin 14.

The clevis or yoke 13 is supported by the transverse member 16 preferably of channel section and provided with apertures 29 through which the arms of the yoke are passed, and the apertures are of such dimensions as to allow a certain degree of rotation of the clevis around a king bolt 17, passing through the web of the transverse member 16 and the clevis 13 and preventing movement of the clevis with respect to the transverse member except about the said bolt as a center. Proper pressure is maintained between the clevis and the transverse member by tightening the nut on the king bolt to the proper degree where it may be held by means of a jam nut as shown.

There are attached to the transverse member 16 two upright members 18 which are threaded and carry set screws 19 which may be held in fixed positions by jam nuts 20. The set screws 19 are used to revolve the clevis or yoke about the king bolt 17 and hold the clevis from revolving about the bolt when properly set up.

The transverse member 16 carries an arm or bracket 21 which is perforated to allow the rod 22 to pass freely therethrough. One end of the rod 22 is bent at a right angle as indicated at 23 and passes through an aperture in a bracket 24 attached to the spider 7, as clearly indicated in Fig. 2. The other extremity of the rod 22 is threaded to carry the nut 25 by which the compression spring 26 is forced against the washer 27, shaped to engage the bracket 21 and center the rod 22 with respect to the aperture in the said bracket in a well known manner as indicated in the drawing.

The spring 26 tends to yieldingly revolve the generator about the axis 14 and thus hold suitable tension upon the belt 4 and, by giving the spring 26 suitable length, the tension upon the belt 4 will remain reasonably constant even though the axle 2 have considerable movement toward and from the generator.

The transverse member 16 may be of any length or desired shape to suitably engage the body of the car and in the drawings is shown as engaging one of the center sills and one of the side sills of a modern steel coach.

From the drawing it will be obvious that proper alinement of the dynamo shaft with respect to axle 2 may easily be obtained by proper adjustment of the set screws 19 and that any such adjustment may be rigidly maintained by setting up the said set screws and their jam nuts and by making up the nuts of the king bolt 17. It will be noted that the king bolt and set screws serve merely to hold the generator in desired relationship to the axle and do not assist in carrying the weight of the generator, which cannot fall even should the king bolt and set screws work out or fracture, as the clevis passing through the openings in the transverse member 16 will always hold the generator from dropping no matter what may happen to the adjusting members.

It will be noted that I have produced a dynamo mounting which is a self-contained unit and may be applied to any car as such; that is, all the parts of my dynamo mounting are attached to the transverse member 16 which when applied to the car body provides the car at one operation with an entire dynamo mounting which is adjustable as to alinement and will serve to adjustably hold proper tension upon the belt. Further it will be noted that by properly dimensioning the spider 7 many types of stock dynamos which are provided with lugs 6 for use with various mounting means may be accommodated by my type of mounting.

I do not wish in any way to limit myself to details of construction or exact modes of operation set forth in the above specification to explain one type of mounting comprehending my invention for it will be obvious that considerable departure may be made without departing from the spirit and scope of my invention, which is as set forth in the following claims:

1. The combination with a car body of a member attached thereto, a rotatable member bearing upon the upper side of the first named member and provided with an extension below the under side thereof, means movably engaging said extension and means for attaching said last named means to a generator.

2. The combination with a car body of a member attached thereto, a rotatable member bearing upon the upper side of the first named member and provided with extensions below the under side thereof, means movably engaging said extensions and means for attaching said last named means to a generator.

3. The combination with a car body, and a member attached thereto, of a rotatable member bearing upon the upper side of the first named member and provided with extensions below the under side thereof, means movably engaging said extensions and a generator carried thereby.

4. The combination with a car body of a member carried thereby, a member movable with respect to said first named member and bearing upon the upper side thereof and provided with depending extensions below said first named member, means movably engaging said extensions and a frame carried by said means adapted to engage a dynamo.

5. The combination with a car body of a member carried thereby, a member movable with respect to said first named member and bearing upon the upper side thereof and provided with depending extensions below said first named member, means movably engaging said extensions, a frame carried by said means and a dynamo carried thereby.

6. The combination with a car body of a member carried thereby, a member movable with respect to said first named member and bearing upon the upper side thereof and provided with depending extensions below said first named member, means movably engaging said extensions, a frame carried by said means, a dynamo provided with members registering with a portion of said frame and removable means engaging said frame and said means to attach a dynamo thereto in fixed operative relation.

7. The combination with a car body, of a member carried thereby, a movable member bearing upon the upper side of the first named member and extending below the under side thereof, means movably engaging said movable member and means for attaching said last named means to a generator, said movable member being capable of rotating the generator with respect to the car-body.

8. The combination with a car body, of a member carried thereby, a movable member bearing upon the upper side of the first named member and extending below the under side thereof, means movably engaging said movable member, and a dynamo carried thereby, said movable member being capable of rotating the generator with respect to the car-body.

9. The combination with a car body, of a member attached thereto, a movable member bearing upon the upper side of the first named member, means movably engaging said movable member, and means for attaching the last named means to a generator, said movable member being capable of rotating the generator with respect to the car-body.

10. The combination with a car body, of a member attached thereto, a movable member bearing upon the upper side of the first named member, means movably engaging said movable member, and a generator movably attached to said last named means, said movable member being capable of rotating the generator with respect to the car-body.

11. The combination with a car body, of a member carried thereby, a member movable with respect to said first named member and bearing upon the upper side thereof, and means movably engaging the last named member comprehending a frame adapted to engage a dynamo, said movable member being capable of rotating the generator with respect to the car-body.

12. The combination with a car body, of a member carried thereby, a member movable with respect to said first named member and bearing upon the upper side thereof, means movably engaging the last named member comprehending a frame adapted to engage a dynamo, and a dynamo carried thereby, said movable member being capable of rotating the generator with respect to the car-body.

13. The combination with a car body, of a member carried thereby, a member movable with respect to said first named member and bearing upon the upper side thereof, means movably engaging said movable member comprehending a frame carried by said means, a dynamo provided with members registering with a portion of said frame, and removable means engaging said frame and said means to attach a dynamo thereto in fixed operative relation, said movable member being capable of rotating the generator with respect to the car-body.

14. A dynamo suspension having in combination with a car and its axle, a frame rigidly secured to the car body, a dynamo having lugs rigid therewith and pivoted to said frame, whereby the dynamo is pivotally suspended from the car body, a belt driving the dynamo from the car axle, means for adjusting the pivotal support of the dynamo to aline the dynamo with the axle, a tension device comprising a spring tending to swing the dynamo away from the driving axle, and means for adjusting the tension of said spring independently of the adjustment of said pivotal support.

WILLIAM F. BOUCHÉ.